US012722108B1

(12) United States Patent
Li

(10) Patent No.: US 12,722,108 B1
(45) Date of Patent: Sep. 1, 2026

(54) AIR PURIFICATION DEVICE CAPABLE OF DISCHARGING AIR BIDIRECTIONALLY

(71) Applicant: Hiso Inc, Ontario, CA (US)

(72) Inventor: Mingying Li, Shenzhen (CN)

(73) Assignee: Hiso Inc, Ontario, CA (US)

( * ) Notice: Subject to any disclaimer, the term of this patent is extended or adjusted under 35 U.S.C. 154(b) by 0 days.

(21) Appl. No.: 19/435,854

(22) Filed: Dec. 30, 2025

(51) Int. Cl.

| | |
|---|---|
| ***B01D 46/00*** | (2022.01) |
| ***F24F 8/108*** | (2021.01) |
| ***F24F 8/80*** | (2021.01) |
| ***F24F 11/89*** | (2018.01) |
| ***F24F 13/02*** | (2006.01) |
| ***F24F 13/08*** | (2006.01) |
| ***F24F 13/20*** | (2006.01) |
| *F04D 29/28* | (2006.01) |

(52) U.S. Cl.
CPC .......... *B01D 46/0047* (2013.01); *F24F 8/108* (2021.01); *F24F 8/80* (2021.01); *F24F 11/89* (2018.01); *F24F 13/20* (2013.01); *B01D 2273/30* (2013.01); *F04D 29/281* (2013.01); *F24F 13/02* (2013.01); *F24F 13/08* (2013.01)

(58) Field of Classification Search
None
See application file for complete search history.

(56) References Cited

U.S. PATENT DOCUMENTS 11,788,544 B2 * 10/2023 Sun .................... F04D 25/0613
415/203
2022/0397292 A1 * 12/2022 Xiang .................. F24F 1/0287

FOREIGN PATENT DOCUMENTS

CN 112262286 A * 1/2021 ......... F04D 29/4246
CN 117967602 A * 5/2024 ............. F04D 25/08
CN 118463372 A * 8/2024 .............. F24F 11/89
CN 119642385 A * 3/2025 .............. F24F 13/24
KR 20090039160 A * 4/2009 .............. F24F 8/108

OTHER PUBLICATIONS

CN112262286A_ENG (Espacenet machine translation of Choi) (Year: 2021).*
CN119642385A_ENG (Espacenet machine translation of Liang) (Year: 2025).*
CN117967602A_ENG (Espacenet machine translation of Wang) (Year: 2024).*
CN118463372A_ENG (Espacenet machine translation of Liang) (Year: 2024).*
KR20090039160A_ENG (Espacenet machine translation of Park) (Year: 2009).*

* cited by examiner

*Primary Examiner* — Gabriel E Gitman
(74) *Attorney, Agent, or Firm* — Nicholas Makridakis

(57) ABSTRACT

An air purification device includes an outer shell, an inner shell, a filter element, and an impeller. The outer shell has a first air outlet hole and a second air outlet hole arranged on opposite sides. The inner shell is disposed in the outer shell and includes a shell body and a volute. The shell body has a plurality of air inlet holes, and the filter element is arranged corresponding to the air inlet holes. One end of the volute communicates with the air inlet holes, and the other end communicates with the outer shell. The air inlet holes, the volute, and the first air outlet hole define a first air duct, and the air inlet holes, the volute, and the second air outlet hole define a second air duct. The impeller is rotatably connected to the shell body and is disposed in the volute.

8 Claims, 5 Drawing Sheets

AIR PURIFICATION DEVICE CAPABLE OF DISCHARGING AIR BIDIRECTIONALLY

TECHNICAL FIELD

The present application relates to the technical field of air purification, and in particular to an air purification device capable of discharging air bidirectionally.

BACKGROUND

An air purifier refers to a purification device capable of adsorbing, decomposing or transforming various air pollutants (such as dust and allergens), which can effectively improve the air cleanliness and is widely applied to ordinary families and industries.

For example, CN 218511131U discloses a bidirectional air-in purifier. The bidirectional air-in purifier includes a machine body and at least two fans. First air inlets are formed in two opposite sides of the machine body, a first air outlet is formed in one side of the machine body adjacent to the two first air inlets, each of the fans is provided with two second air inlets arranged axially and second air outlets formed in sides, each of the fans is arranged in the machine body, the two second air inlets of each of the fans face toward the two first air inlets, respectively, the second air outlets of each of the fans face toward the first air outlets, and filtering devices are arranged at the first air inlets and/or the second air inlets. However, the purifier adopts unilateral air output, which is not beneficial to the overall circulation of indoor air and is not suitable for wall hanging.

SUMMARY

Based on this, it is necessary to provide an air purification device capable of discharging air bidirectionally to solve the above problems.

In some embodiments of the present disclosure, an air purification device capable of discharging air bidirectionally is provided, including an outer shell, an inner shell, a filter element and an impeller. Herein a first air outlet hole and a second air outlet hole are arranged in two sides of the outer shell, respectively; the inner shell is disposed in the outer shell, the inner shell includes a shell body and a volute, the shell body is provided with a plurality of air inlet holes, one end of the volute is connected to the shell body and the other end of the volute is connected to the outer shell, one end of the volute is configured to be communicated with the air inlet holes; the air inlet holes, the volute and the first air outlet hole are communicated to form a first air duct; and the air inlet holes, the volute and the second air outlet hole are communicated to form a second air duct. The filter element is mounted in the shell body, and the filter element is arranged corresponding to the air inlet holes; and the impeller is rotatably connected to the shell body, and the impeller is mounted in the volute.

In some embodiments of the present disclosure, the inner shell further includes a first air guide cover and a second air guide cover, the first air guide cover and the second air guide cover are mounted on two sides of the volute, respectively. One end of the first air guide cover is communicated with the volute and the other end of the first air guide cover is communicated with the first air outlet hole. One end of the second air guide cover is communicated with the volute and the other end of the second air guide cover is communicated with the second air outlet hole.

In some embodiments of the present disclosure, the inner shell further includes a first limiting member and a second limiting member, the first limiting member and the second limiting member are mounted on two sides of the shell body, respectively. The first limiting member is configured to be abutted against the first air guide cover, and the second limiting member is configured to be abutted against the second air guide cover.

In some embodiments of the present disclosure, the air purification device capable of discharging air bidirectionally further includes a control assembly, where the control assembly includes a bracket, a control board, a sensor and a display screen. The bracket is mounted on the outer shell, the control board is mounted on the bracket, the sensor is mounted on the shell body, the display screen is mounted on the outer shell, and the display screen and the sensor are electrically connected to the control board.

In some embodiments of the present disclosure, the control assembly further includes a sealing plate and a cable, the sealing plate is mounted at one end of the outer shell away from the display screen, and one end of the cable is electrically connected to the control board and the other end of the cable is accommodated in an accommodating cavity of the sealing plate.

In some embodiments of the present disclosure, the air purification device capable of discharging air bidirectionally further includes a cover plate, where the shell body is covered with the cover plate; the cover plate is provided with a plurality of through holes, and the through holes are configured to be communicated with the air inlet holes.

In some embodiments of the present disclosure, the impeller includes a rotating shaft, a bearing, a bottom plate, a fixed base, a partition plate and a plurality of fan blades. The fixed base is mounted in a middle of the bottom plate, the bearing is mounted on the fixed base, and the rotating shaft is configured to pass through the bearing; and one side of each of the fan blades is connected to the bottom plate and the other side of each of the fan blades is connected to the partition plate, and the fan blades are arranged at intervals along a peripheral edge of the bottom plate to form air outlets.

In some embodiments of the present disclosure, a gap is formed between the impeller and the volute, and the gap is gradually increased toward one end of the first air outlet hole or the second air outlet hole.

In some embodiments of the present disclosure, one side of the volute is configured to be communicated with the first air outlet hole, and the other side of the volute is configured to be communicated with the second air outlet hole.

In some embodiments of the present disclosure, a plurality of volutes, impellers, first air outlet holes and second air outlet holes are provided and in one-to-one correspondence; and one of the volutes is configured to be communicated with the first air outlet holes, and other volutes are configured to be communicated with the second air outlet holes.

Compared with existing technologies, the air purification device capable of discharging air bidirectionally of the present disclosure has the following beneficial effects.

The air purification device capable of discharging air bidirectionally provided by the present disclosure, the first air outlet hole and the second air outlet hole are formed in two sides of the outer shell, respectively, one end of the volute is configured to be communicated with the air inlet holes; the air inlet holes, the volute and the first air outlet hole are communicated to form the first air duct, and the air inlet holes, the volute and the second air outlet hole are communicated to form the second air duct, thereby discharging air bidirectionally, accelerating the overall circulation of the air and improving the air purification efficiency.

Figure 1:
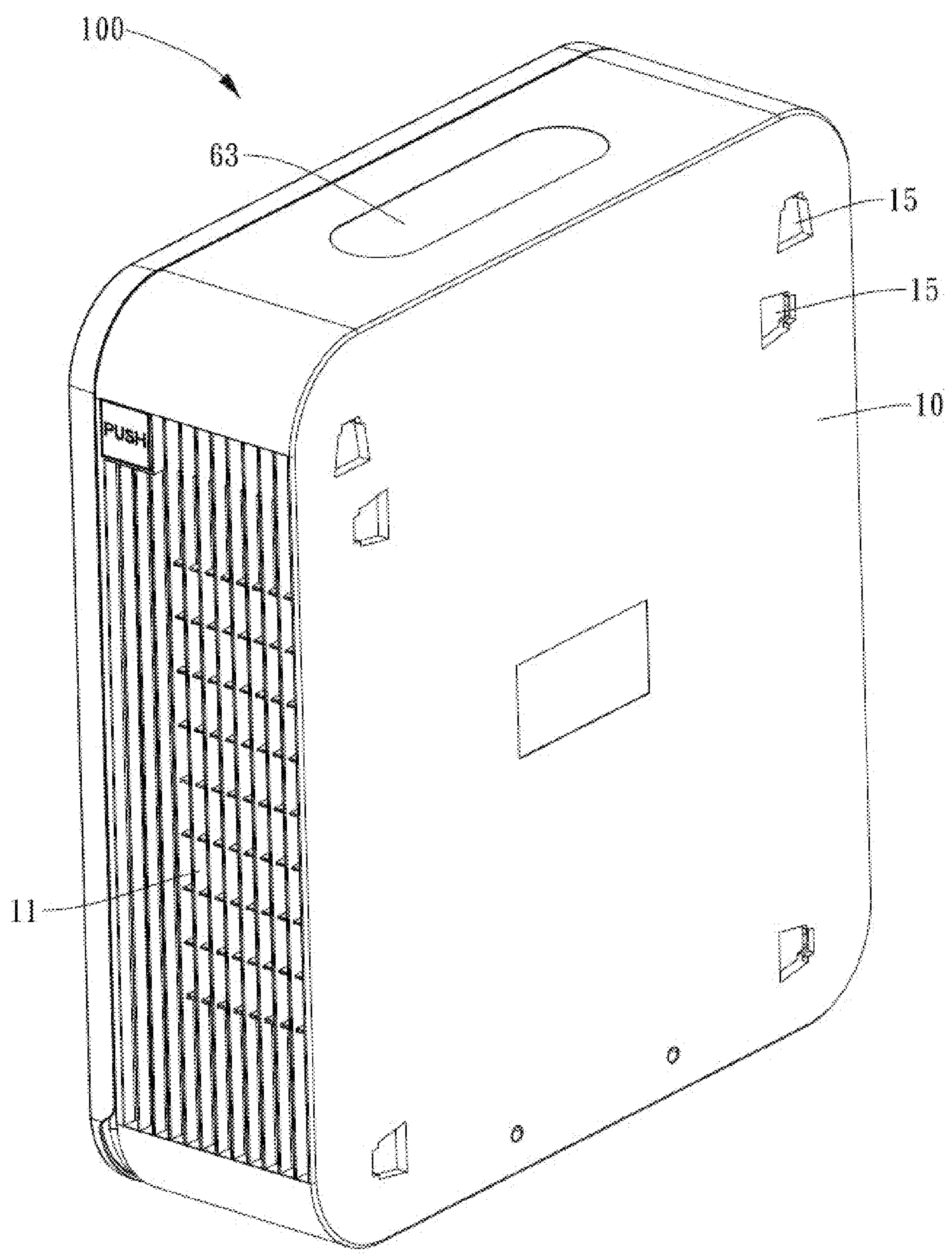
FIG. 1 shows a schematic diagram of an assembling structure of an air purification device in accordance with some embodiments of the present disclosure.

The reference numerals in the drawings are as follows.

100. air purification device; 10. outer shell; 11. first air outlet hole; 12. second air outlet hole; 13. limiting groove; 14. sliding groove; 15: insertion hole.

20. inner shell; 21. shell body; 211. air inlet hole; 212. groove; 22. volute; 221. first air duct; 222. second air duct; 23. first air guide cover; 24. second air guide cover; 25. first limiting member; 26. second limiting member.

30. filter element; 40. impeller; 41. rotating shaft; 42. bottom plate; 43. fixed base; 44. partition plate; 45. fan blade; 46. air outlet; 50. cover plate; 51. through hole; 60. control assembly; 61. bracket; 62. sensor; 63. display screen; 64. sealing plate.

100*a*. air purification device.

22*a*. volute; 23*a*. first air guide cover; 24*a*. second air guide cover; 40*a*. impeller.

DETAILED DESCRIPTION OF CURRENTLY PREFERRED EMBODIMENTS

To make the above objectives, features and advantages of the present disclosure more apparent and understandable, the specific embodiments of the present disclosure are described in detail below with reference to the drawings. In the following description, numerous specific details are provided to facilitate a thorough understanding of the present disclosure. However, the present disclosure can be implemented in many ways different from those described here. Those skilled in the art can make similar improvements without departing from the spirit of the present disclosure. Thus, the present disclosure is not limited by the specific embodiments disclosed below.

In the description of the present disclosure, it should be understood that orientation or position relationships indicated by the terms such as "center", "longitudinal", "transverse", "length", "width", "thickness", "above", "below", "front", "back", "left", "right", "perpendicular", "horizontal", "top", "bottom", "inside", "outside", "clockwise", "anticlockwise", "axial direction", "radial direction", and "circumferential direction" are based on the orientation or position relationships shown in the accompanying drawings, and are merely intended to facilitate a simple description of this application, rather than indicating or implying that the mentioned device or element must have a particular orientation or must be constructed and operated in a particular orientation. Therefore, such terms should not be construed as limitations to this application.

In addition, terms "first" and "second" are used merely for the purpose of description, and shall not be construed as indicating or implying relative importance or implicitly indicating a quantity of indicated technical features. Therefore, a feature defined by "first" or "second" may explicitly indicate or implicitly include at least one of such features. In the description of the present disclosure, "a plurality of" means at least two, for example, two or three, unless otherwise clearly and specifically limited.

In the present disclosure, unless otherwise clearly specified and limited, the terms "mounting", "connected", "connection", "fixation" and the like are intended to be understood in a broad sense. For example, the "connection" may be a fixed connection, removable connection or integral connection; may be a mechanical connection or electrical connection; may be a direct connection or indirect connection using a medium; and may be a communication or interaction between two elements, unless otherwise explicitly limited. For those of ordinary skill in the art, the specific meaning of the above-mentioned terms in the present disclosure can be construed according to specific cases.

In the present disclosure, unless otherwise specified and limited, the first feature "above" or "below" the second feature may be direct contact of the first feature and the second feature, or indirect contact of the first feature and the second feature through the intermediate medium. In addition, the first feature being "above", "over", or "on" the second feature may refer to the first feature being over or above the second feature, or may merely indicate that the horizontal position of the first feature is higher than that of the second feature. The first feature being "under", "below" or "beneath" the second feature may refer to the first feature being under or below the second feature or may merely indicate that the horizontal position of the first feature is less than that of the second feature.

It should be noted that when an element is referred to as being "fixed" or "arranged" on another element, the element may be directly arranged on another element or a central element may be present. When an element is considered to be "connected to" another element, the element may be directly connected to another element or an intermediate element may be simultaneously present. The terms "perpendicular", "horizontal", "upper", "lower", "left", "right", and other similar expressions used herein are only for purposes of illustration and are not intended to represent the only implementation.

Referring to FIG. 1 to FIG. 5, in some embodiments of the present disclosure, an air purification device 100 capable of discharging air bidirectionally is provided, which includes an outer shell 10, an inner shell 20, a filter element 30 and an impeller 40, where a first air outlet hole 11 and a second air outlet hole 12 are formed in two sides of the outer shell 10, respectively; the inner shell 20 is covered with the outer shell 10, the inner shell 20 includes a shell body 21 and a volute 22, the shell body 21 is provided with a plurality of air inlet holes 211, one end of the volute 22 is connected to the shell body 21 and the other end of the volute is connected to the outer shell 10, one end of the volute 22 is configured to be communicated with the air inlet holes 211; the air inlet holes 211, the volute 22 and the first air outlet hole 11 are communicated to form a first air duct 221; and the air inlet holes 211, the volute 22 and the second air outlet hole 12 are communicated to form a second air duct 222; the filter element 30 is mounted in the shell body 21, and the filter element 30 is arranged corresponding to the air inlet holes 211; and the impeller 40 is rotatably connected to the shell body 21, and the impeller 40 is mounted in the volute 22. According to the air purification device 100 capable of discharging air bidirectionally, the first air outlet hole 11 and the second air outlet hole 12 are formed in two sides of the outer shell 10, respectively; one end of the volute 22 is configured to communicated with the air inlet holes 211; the air inlet holes 211, the volute 22 and the first air outlet hole 11 are communicated to form the first air duct 221; and the air inlet holes 211, the volute 22 and the second air outlet hole 12 are communicated to form the second air duct 222, thereby discharging air bidirectionally, accelerating the overall circulation of the air and improving the air purification efficiency.

As shown in FIG. 1 to FIG. 4, in some embodiments of the present disclosure, a first air outlet hole 11 and a second air outlet hole 12 are formed in two sides of an outer shell 10, respectively. Optionally, a limiting groove 13 is formed in an inner side of the outer shell 10; further, a sliding groove 14 is formed at one end of the outer shell 10. In some embodiments of the present disclosure, a plurality of insertion holes 15 are formed in an outer side of the outer shell 10 to accommodate supporting members, and are suitable for wall hanging.

Figure 2:
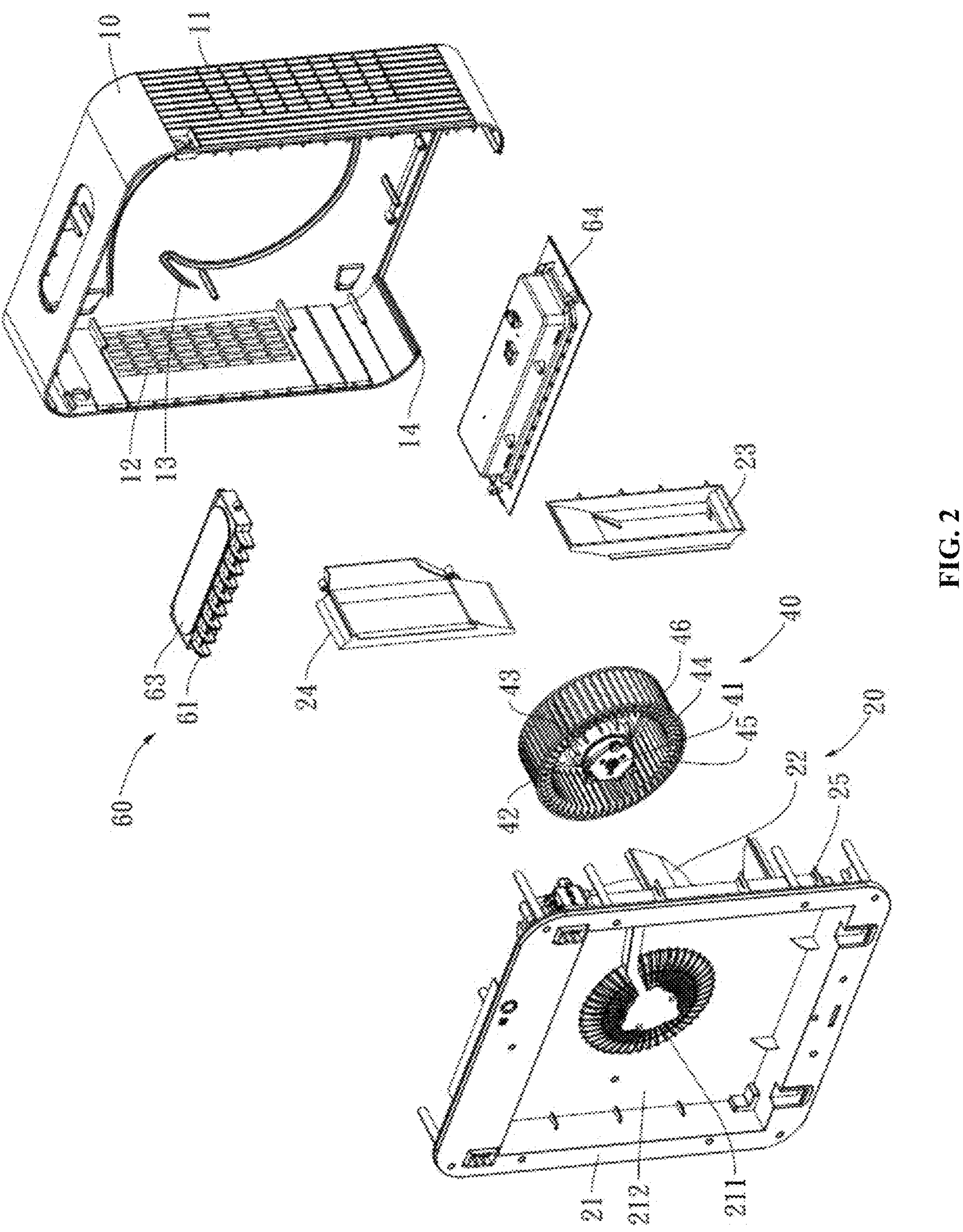
FIG. 2 shows an exploded view of the air purification device in FIG. 1, where a filter element and a cover plate are not shown.
Figure 3:
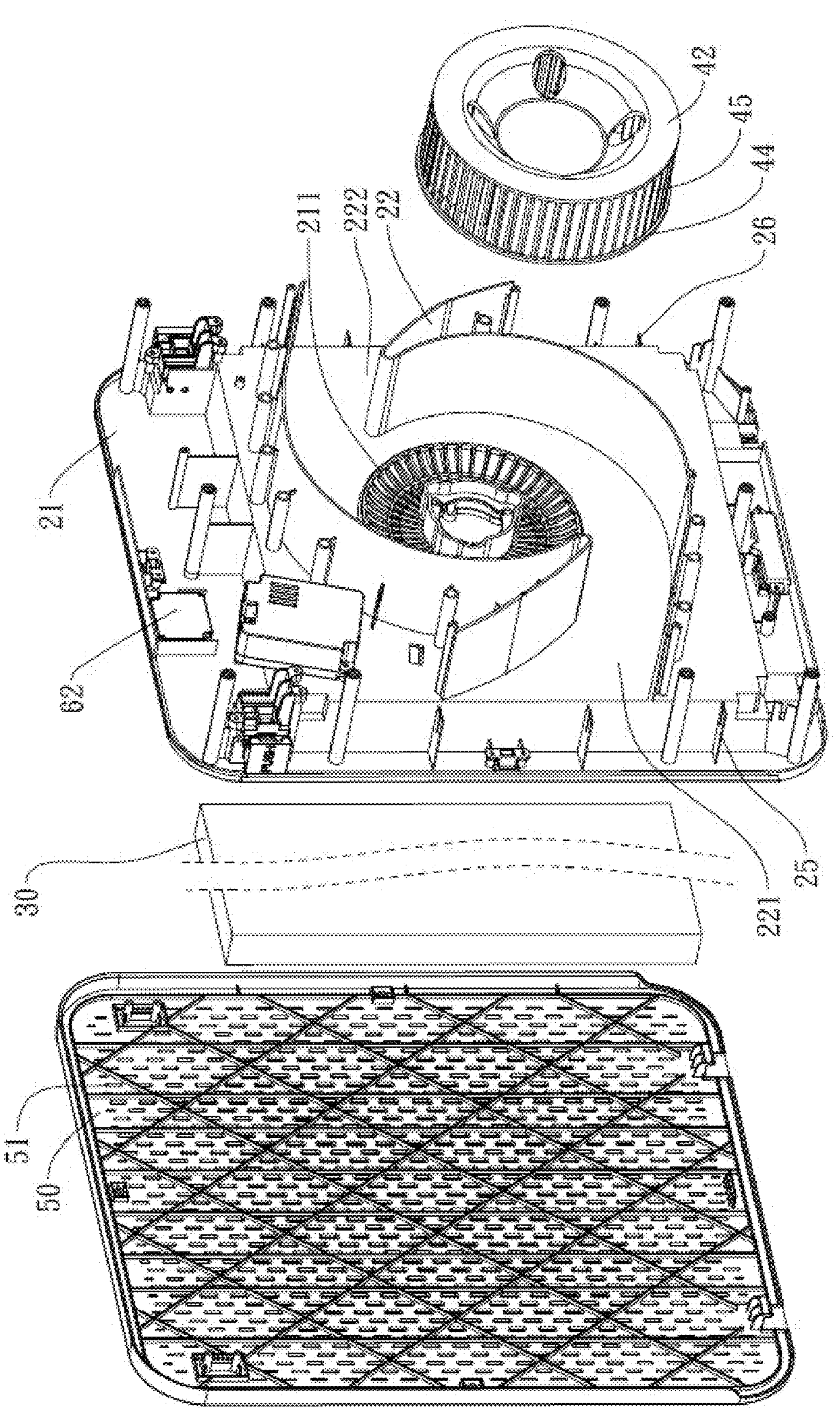
FIG. 3 shows another exploded view of the air purification device in FIG. 1, where an outer shell, a bracket, a first air guide cover, a second air guide cover, a display screen and a sealing plate are not shown.
Figure 4:
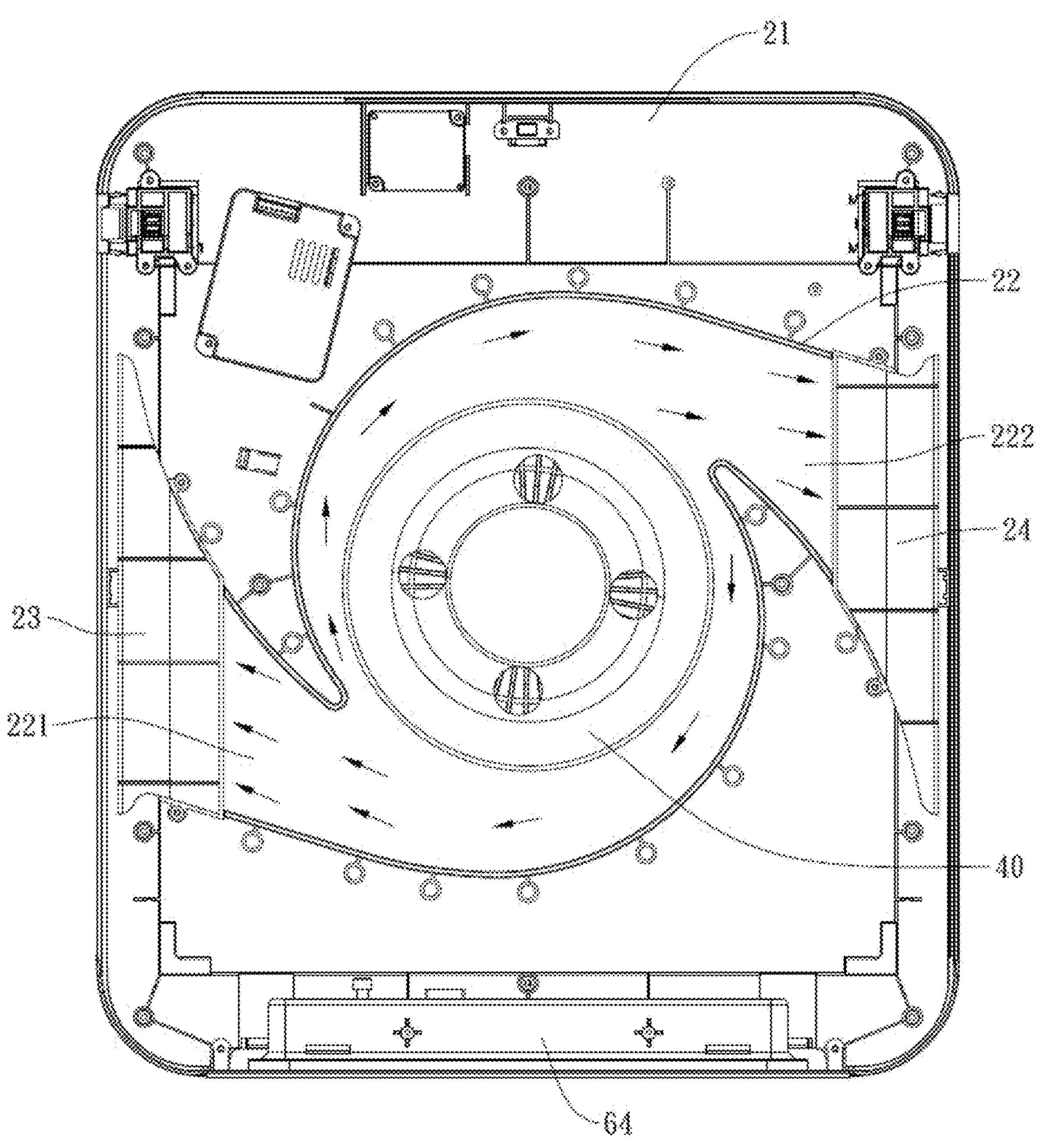
FIG. 4 shows a schematic diagram of an airflow direction when the air purification device in FIG. 1 works in accordance with some embodiments of the present disclosure.

As shown in FIG. 2 to FIG. 4, the outer shell 10 is covered with the inner shell 20. Optionally, the inner shell 20 includes a shell body 21 and a volute 22, and the shell body 21 is provided with a plurality of air inlet holes 211. Further, the shell body 21 is provided with a groove 212 communicating with a vent hole; one end of the volute 22 is connected to the shell body 21 and the other end of the volute is connected to the outer shell 10. One end of the volute 22 is configured to be communicated with the air inlet holes 211; the air inlet holes 211, the volute 22 and the first air outlet hole 11 are communicated to form a first air duct 221; and the air inlet holes 211, the volute 22 and the second air outlet hole 12 are communicated to form a second air duct 222, thereby discharging air bidirectionally. Optionally, the limiting groove 13 is configured to accommodate the volute 22 to improve the air tightness. And further, the shell body 21 and the outer shell 10 are fixed through a screw.

In some embodiments of the present disclosure, the inner shell 20 further includes a first air guide cover 23 and a second air guide cover 24, the first air guide cover 23 and the second air guide cover 24 are mounted on two sides of the volute 22, respectively. One end of the first air guide cover 23 is configured to be communicated with the volute 22 and the other end of the first air guide cover is configured to be communicated with the first air outlet hole 11. And one end of the second air guide cover 24 is configured to be communicated with the volute 22 and the other end of the second air guide cover is configured to be communicated with the second air outlet hole 12. The first air guide cover 23 and the volute 22 as well as the second air guide cover 24 and the volute 22 are fixed through screws. in some embodiments of the present disclosure, the inner shell 20 further includes a first limiting member 25 and a second limiting member 26, the first limiting member 25 and the second limiting member 26 are mounted on two sides of the shell body 21, respectively. The first limiting member 25 is configured to be abutted against the first air guide cover 23, and the second limiting member 26 is configured to be abutted against the second air guide cover 24, thereby further ensuring that the structure is firm.

Referring to FIG. 2 and FIG. 3 again, the filter element 30 is mounted in the shell body 21, and the filter element 30 is arranged corresponding to the air inlet holes 211; optionally, the filter element 30 is detachably connected to the shell body 21 to facilitate replacement; and further, the filter element 30 is accommodated in the groove 212.

As shown in FIG. 2 to FIG. 4, the impeller 40 is rotatably connected to the shell body 21, and the impeller 40 is mounted in the volute 22; and optionally, a gap is formed between the impeller 40 and the volute 22, and the gap is gradually increased toward one end of the first air outlet hole 11 or the second air outlet hole 12, thereby increasing an exhaust pressure. Further, the impeller 40 includes a rotating shaft 41, a bearing (not shown in the figure), a bottom plate 42, a fixed base 43, a partition plate 44 and a plurality of fan blades 45, the fixed base 43 is mounted in the middle of the bottom plate 42, the bearing is mounted in the fixed base 43, and the rotating shaft 41 is configured to pass through the bearing; and one side of each of the fan blades 45 is connected to the bottom plate 42 and the other side of each of the fan blades is connected to the partition plate 44, and the fan blades 45 are arranged at intervals along a peripheral edge of the bottom plate 42 to form air outlets 46. In some embodiments of the present disclosure, the fan blades 45 are arranged in an arc shape. In some embodiments of the present disclosure, one volute 22 and one impeller 40 are provided, and one side of the volute 22 is communicated with the first air outlet hole 11 and the other side of the volute is communicated with the second air outlet hole 12; and along with the rotation of the impeller 40, the purified air is discharged from the first air outlet hole 11 and the second air outlet hole 12, respectively.

As shown in FIG. 3, the air purification device 100 further includes a cover plate 50, and the shell body 21 is covered with the cover plate 50; optionally, the cover plate 50 is provided with a plurality of through holes 51, and the through holes 51 are communicated with the air inlet holes 211; and further, the cover plate 50 is connected to the shell body 21 through a snap-fit or magnet manner.

As shown in FIG. 1 to FIG. 3, the air purification device 100 further includes a control assembly 60, the control assembly 60 includes a bracket 61, a control board (not shown in the figures), a sensor 62 and a display screen 63. The bracket 61 is mounted on the outer shell 10, the control board is mounted on the bracket 61, the sensor 62 is mounted on the shell body 21, the display screen 63 is mounted on the outer shell 10, and the display screen 63 and the sensor 62 are electrically connected to the control board; optionally, the display screen 63 is a touch screen, and the operation of the impeller 40 is controlled by the display screen 63; and further, the sensor 62 is a PM2.5 air quality sensor. In some embodiments of the present disclosure, the control assembly 60 further includes a sealing plate 64 and a cable (not shown in the figures), and the sealing plate 64 is mounted at one end of the outer shell 10 away from the display screen 63, optionally, the sealing plate 64 is inserted into the sliding groove 14; and one end of the cable is electrically connected to the control board and the other end of the cable is accommodated in an accommodating cavity of the sealing plate 64 so as to accommodate the cable.

During use, along with the rotation of the impeller 40, after the external air is filtered by the filter element 30, the purified air enters the volute 22 through the air inlet holes 211, then enters the first air duct 221 or the second air duct 222 through the air outlet 46 of the impeller 40, and is discharged through the first air outlet hole 11 or the second air outlet hole 12, thereby discharging air bidirectionally, accelerating the overall circulation of the air and improving the air purification efficiency.

According to the air purification device 100 capable of discharging air bidirectionally provided by the present disclosure, the first air outlet hole 11 and the second air outlet hole 12 are formed in two sides of the outer shell 10, respectively. One end of the volute 22 is communicated with the air inlet holes 211; the air inlet holes 211, the volute 22 and the first air outlet hole 11 are communicated to form the first air duct 221; and the air inlet holes 211, the volute 22 and the second air outlet hole 12 are communicated to form the second air duct 222, thereby discharging air bidirectionally, accelerating the overall circulation of the air and improving the air purification efficiency.

Figure 5:
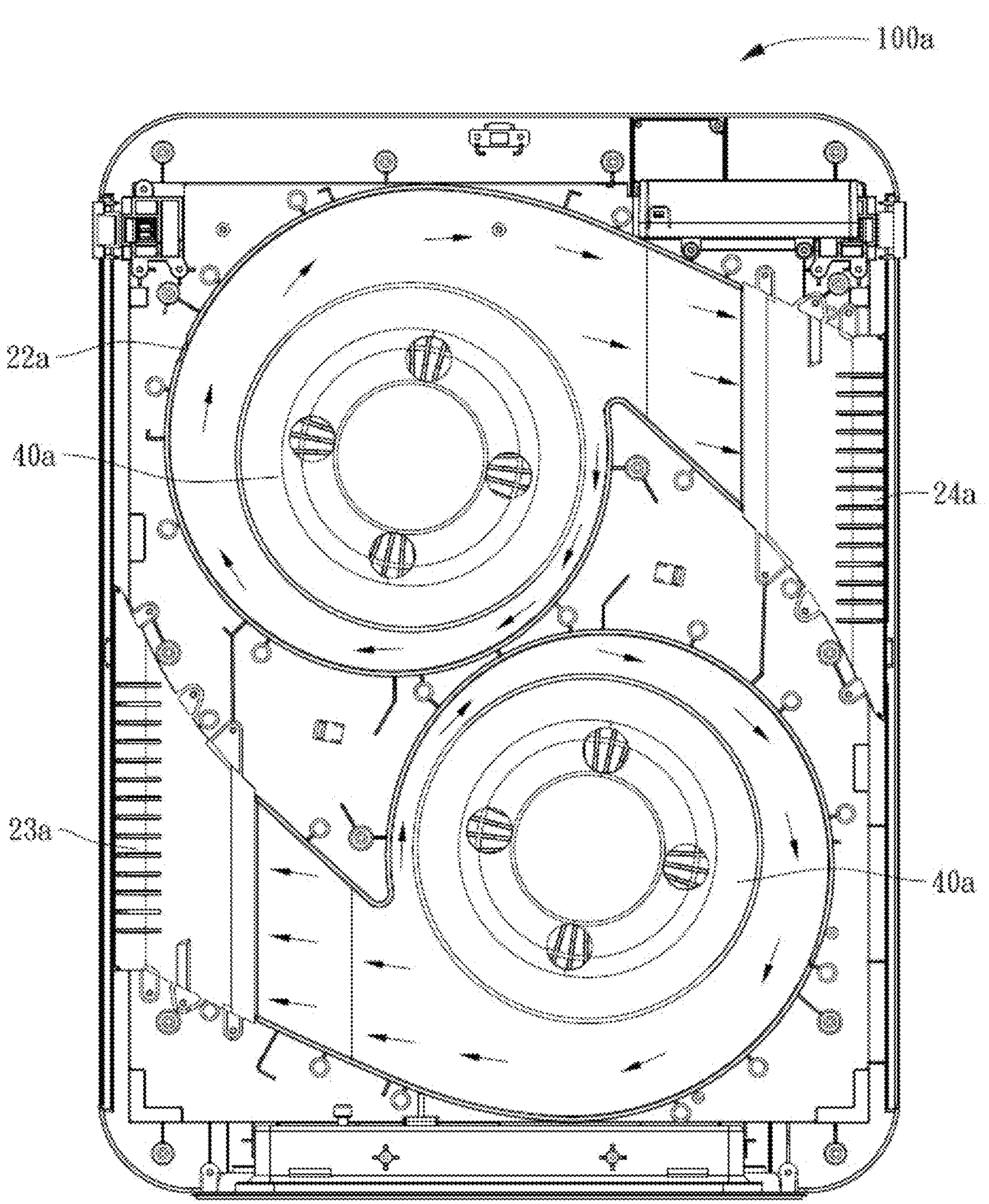
FIG. 5 shows a schematic diagram of an airflow direction when an air purification device works in accordance with some other embodiments of the present disclosure.

Referring to FIG. 5, an air purification device 100*a* according to some other embodiments of the present disclosure is provided, which is similar to the air purification device 100 in the above embodiments, the difference is that, a plurality of volutes 22*a*, impellers 40*a*, first air outlet holes and second air outlet holes are provided and in one-to-one correspondence; and one of the volutes 22*a* is configured to be communicated with the first air outlet holes, and the other volutes 22*a* are configured to be communicated with the second air outlet holes. Optionally, two volutes 22*a* and two impellers 40*a* are provided, one volute 22*a* is configured to be communicated with the first air outlet holes, and the other volute 22*a* is configured to be communicated with the second air outlet holes. Further, one volute 22*a* is connected to a first air guide cover 23*a*, and the other volute 22*a* is configured to be communicated with a second air guide cover 24*a*; and each of the volutes 22*a* corresponds to one impeller 40*a*, so that the air outlet pressure and the air outlet quantity of each of the air outlet holes can be increased.

The technical features of the above embodiments can be combined arbitrarily. To simplify the description, possible combinations of the technical features of the above embodiments are not completely described. However, as long as there is no contradiction between the combinations of these technical features, the combinations should be considered to fall within the scope of the present specification.

The above embodiments only express several embodiments of the present disclosure, and specific and detailed descriptions thereof are provided. However, these embodiments cannot be understood as limitations on the scope of the patent of the present disclosure. It should be pointed out that several variations and improvements may be made by those of ordinary skill in the art without departing from the conception of the present disclosure, but such variations and improvements should fall within the protection scope of the present disclosure. Therefore, the protection scope of the patent of the present disclosure should be subject to the claims.

What is claimed is:

1. An air purification device capable of discharging air bidirectionally, comprising an outer shell, an inner shell, a filter element and an impeller;

wherein a first air outlet hole and a second air outlet hole are arranged in two sides of the outer shell, respectively;

wherein the inner shell is disposed in the outer shell, the inner shell comprises a shell body and a volute;

wherein the shell body is provided with a plurality of air inlet holes, one end of the volute is connected to the shell body and another end of the volute is connected to the outer shell;

wherein one end of the volute is configured to be communicated with the air inlet holes; the air inlet holes, the volute and the first air outlet hole are communicated to form a first air duct; and the air inlet holes, the volute and the second air outlet hole are communicated to form a second air duct;

wherein the filter element is mounted in the shell body, and the filter element is arranged corresponding to the air inlet holes; and wherein the impeller is rotatably connected to the shell body, and the impeller is mounted in the volute;

wherein the inner shell further comprises a first air guide cover and a second air guide cover, the first air guide cover and the second air guide cover are mounted on two sides of the volute, respectively; one end of the first air guide cover is communicated with the volute and another end of the first air guide cover is communicated with the first air outlet hole; and one end of the second air guide cover is communicated with the volute and another end of the second air guide cover is communicated with the second air outlet hole;

wherein the inner shell further comprises a first limiting member and a second limiting member, the first limiting member and the second limiting member are mounted on two sides of the shell body, respectively; the first limiting member is configured to be abutted against the first air guide cover, and the second limiting member is configured to be abutted against the second air guide cover.

2. The air purification device capable of discharging air bidirectionally according to claim 1, wherein the air purification device further comprises a control assembly, the control assembly comprises a bracket, a control board, a sensor and a display screen; wherein the bracket is mounted on the outer shell, the control board is mounted on the bracket, the sensor is mounted on the shell body, the display screen is mounted on the outer shell, and the display screen and the sensor are electrically connected to the control board.

3. The air purification device capable of discharging air bidirectionally according to claim 2, wherein the control assembly further comprises a sealing plate and a cable, the sealing plate is mounted at one end of the outer shell away from the display screen, one end of the cable is electrically connected to the control board and another end of the cable is accommodated in an accommodating cavity of the sealing plate.

4. The air purification device capable of discharging air bidirectionally according to claim 1, wherein the air purification device further comprises a cover plate, and the shell body is covered with the cover plate; wherein the cover plate is provided with a plurality of through holes, and the through holes are configured to be communicated with the air inlet holes.

5. The air purification device capable of discharging air bidirectionally according to claim 1, wherein the impeller comprises a rotating shaft, a bearing, a bottom plate, a fixed base, a partition plate and a plurality of fan blades; wherein the fixed base is mounted in a middle of the bottom plate, the bearing is mounted on the fixed base, and the rotating shaft is configured to pass through the bearing; wherein one side of each of the fan blades is connected to the bottom plate and another side of each of the fan blades is connected to the partition plate; and wherein the fan blades are arranged at intervals along a peripheral edge of the bottom plate to form air outlets.

6. The air purification device capable of discharging air bidirectionally according to claim 1, wherein a gap is formed between the impeller and the volute, and the gap is gradually increased toward one end of the first air outlet hole or the second air outlet hole.

7. The air purification device capable of discharging air bidirectionally according to claim 1, wherein one side of the volute is configured to be communicated with the first air outlet hole and another side of the volute is configured to be communicated with the second air outlet hole.

8. The air purification device capable of discharging air bidirectionally according to claim 1, wherein the device comprises a plurality of additional volutes, a plurality of additional impellers, a plurality of additional first air outlet holes and a plurality of additional second air outlet holes that are provided and in one-to-one correspondence; and one of the additional volutes is configured to be communicated with the first air outlet holes, and other volutes are configured to be communicated with the second air outlet holes.

* * * * *